United States Patent [19]

Justice et al.

[11] 4,225,771
[45] Sep. 30, 1980

[54] METHOD AND APPARATUS FOR MONITORING ARC WELDING

[75] Inventors: James W. H. Justice, Murrysville, Pa.; Paul G. Kennedy, Annapolis, Md.; Robert C. Miller, Penn Hills, Pa.

[73] Assignee: Westinghouse Electric Corp., Pittsburgh, Pa.

[21] Appl. No.: 33,062

[22] Filed: Apr. 25, 1979

[51] Int. Cl.$^2$ .................... B23K 9/00; B23K 9/32; H04N 7/18
[52] U.S. Cl. ............................. 219/137 R; 219/147; 350/311; 358/101; 358/108; 358/225
[58] Field of Search ................ 358/101, 108, 225; 219/137 R, 147; 350/311, 316

[56] References Cited

U.S. PATENT DOCUMENTS

| | | | |
|---|---|---|---|
| 2,194,573 | 3/1940 | Schulz | 219/147 |
| 2,481,808 | 9/1949 | Barna | 219/147 |
| 3,227,866 | 1/1966 | Peters | 219/147 |
| 3,526,748 | 9/1970 | Rienks | 219/130.01 |
| 3,732,412 | 5/1973 | Tyroler | 362/293 |
| 3,781,512 | 12/1973 | Grubbs | 219/137 R |
| 3,916,145 | 10/1975 | Grubbs | 219/147 |
| 4,001,497 | 1/1977 | Bosworth | 358/101 |
| 4,021,840 | 5/1977 | Ellsworth | 358/101 |
| 4,045,125 | 8/1977 | Farges | 351/44 |
| 4,118,732 | 10/1978 | Ichijima | 358/101 |

*Primary Examiner*—Howard W. Britton
*Attorney, Agent, or Firm*—Daniel C. Abeles; Z. L. Dermer

[57] ABSTRACT

A method and apparatus for lowering the contrast range between a welding arc and its surroundings for remote viewing of an arc welding process. A monochromatic light source (10) is used to illuminate the area surrounding the welding arc (18) and a narrow band interference filter (22) tuned to the wavelength of the monochromatic light (10), is placed in front of a viewing camera (24). The monochromatic light enhances the arc background while the filter (22) attenuates the arc illumination that reaches the camera for a more desirable contrast ratio so that the arc, weld puddle and surrounding area can be visible with a high degree of definition on the monitor.

6 Claims, 1 Drawing Figure

METHOD AND APPARATUS FOR MONITORING ARC WELDING

BACKGROUND OF THE INVENTION

This invention pertains generally to methods and apparatus employed to remotely view welding processes on-line and more particularly to such methods and apparatus as are applicable to arc welding processes.

A major difficulty exists in monitoring arc welding processes due to the extremely high contrast range between the arc and the surrounding environment. This problem becomes particularly difficult when remote monitoring is desired. For high quality control of the weld it is extremely advantageous to be able to see the arc, the surrounding metal and the welding pool while the welding operation is in progress. Remote monitoring is particularly desirable where the welding application is performed remotely in a hostile environment, such as in nuclear steam generators.

Previously, in order to directly view the arc during the welding process welders generally employed a protective helmet having a smoked viewing lens which attenuated light over the entire visual spectrum, and thus failed to enhance the contrast ratio between the arc and its surroundings which masked most of the details of the process. Where remote systems were employed special filtering arrangements such as the system taught in U.S. Pat. No. 4,021,840 issued May 3, 1977 were provided to screen out infrared and ultraviolet radiation while passing visible light reflected from the workpiece unattenuated, for the purpose of avoiding overloading cameras used to view the process.

One possible approach to reduce the contrast ratio would be to flood the area surrounding the welding arc with light. However, the amount of light required to produce an acceptable contrast ratio is extremely high and incandescent white light sources in excess of one kilowatt beamed directly on the area have shown negligible improvement.

Accordingly, an improved apparatus and method for viewing an arc welding process is desired that will reduce the contrast between the arc and its surroundings and provide a high definition image amenable to remote viewing.

SUMMARY OF THE INVENTION

This invention provides an arc welding viewing system and method which attenuates the light emanating from the arc (18) while enhancing the background illumination to reduce the contrast of the viewed image while increasing its definition. This system includes a light source (10) which is operable to generate a given intensity of light substantially within a preselected band, focused to illuminate the area surrounding the welding arc (18). Means are provided for viewing the arc and its surrounding area which includes a filter (22) for filtering the light reflected from the arc and its proximate surroundings to pass only the preselected light band through to the viewing area (24). The preselected light band is substantially narrower than the light spectrum generated by the welding arc.

BRIEF DESCRIPTION OF THE DRAWING

For a better understanding of the invention, reference may be had to the preferred embodiment, exemplary of the invention, shown in the accompanying drawing, in which the FIGURE illustrates a perspective view of the arc welding viewing system of this invention.

DESCRIPTION OF THE PREFERRED EMBODIMENT

Figure 1:
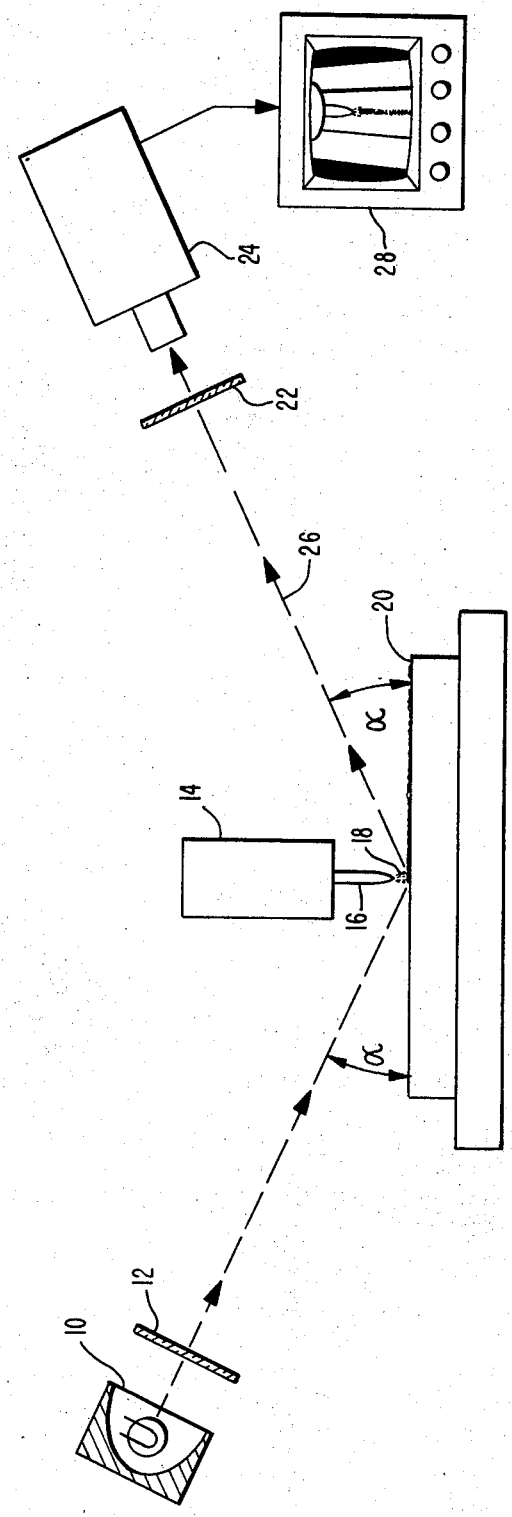

The method and apparatus of this invention can be appreciated by reference to the FIGURE which illustrates a welding head 14 having an electrode 16 which is shown striking an arc 18 between the electrode and the workpiece 20. In accordance with this invention a monochromatic light source 10 is focused to direct a narrow beam of light through a lens 12 to the arc 18 and the proximate surrounding area on the workpiece 20. The intensity of the light source is chosen to provide the desired definition. A very narrow band interference filter 22, tuned to the wavelength of the monochromatic light, is positioned to intercede the reflected light along the path 26 in front of the viewing area, which is represented by the camera 24. The image thus viewed can be displayed on the monitor 28. Because the arc has a very wide spectral response which is relatively well distributed over the visible spectrum, apart from a few narrow spikes, the narrow band filter 22 attenuates the light from the arc which reaches the camera. The light source 10 serves to illuminate the surrounding area and substantially reduces the contrast between the weld puddle and surrounding metal and the arc when viewed on the camera side of the filter 22.

For example, if it is assumed the arc has a substantially even response over the visual spectrum of 4000° angstrom (A) to 7000° A, a narrow band filter 22 of 100° A would reduce the amount of visible light reaching the camera 24 by approximately 30:1. If the area surrounding the welding arc 18 is illuminated with monochromatic light from the light source 10 to match the narrow band filter 22, the reflected monochromatic light 26 will pass through the filter 22 to the camera with negligible attenuation. Adjustment of the intensity of light on the surrounding area around the arc will permit the contrast ratio to be set to the required level so that the arc, surrounding area and welding pool are all readily visible with the degree of definition desired.

A 400 watt thallium iodide lamp can be employed as the monochromatic light source 10. This type of source has approximately forty percent of its radiated energy concentrated in a 100° A bandwidth centered around 5370° A. A narrow band filter 22 of 100° A centered at 5370° A is used in front of the camera lens 24, and adjustment of the light to the camera is achieved by means of the lens aperture. Other combinations of light sources and corresponding filters can be used; however, experimental results have shown that thallium iodide is extremely suitable for this purpose.

In order to concentrate the illumination on the area of the workpiece surrounding the welding arc a lens 12 is used to focus the monochromatic light of the area of interest. Furthermore, an increase in the amount of reflected light from areas of interest can be achieved by correct selection of the angle of the light source and camera. In the FIGURE the angle of incidence of the light and the angle of the camera are adjusted to make use of specular reflection from the surface. In this case the camera and the light source are on opposite sides of the welding head. Other optical arrangements with mirrors can be employed to position the camera and light source on the same side of the welding head. Another alternative is to use light pipes, or fiber optics, to direct the monochromatic light to the welding area and carry the picture information to the camera via the narrow band filter.

In this application it is desirable to employ a silicon diode type of vidicon rather than a standard vidicon. A standard vidicon is prone to image burn on the target when subjected to high intensity light levels. Also, bright areas on a standard vidicon "bloom" or spread. The silicon diode tube is not subject to these problems and is therefore much more rugged for this purpose.

It should be appreciated that in accordance with the method and apparatus of this invention direct viewing by a welder could be achieved by employing a portable monochromatic light (i.e., a flashlight) to illuminate the welding area and a welding helmet having the normal smoked glass replaced with a suitable narrow band filter.

Thus, employing the concepts of this invention visual inspection of the welding process can be enhanced to enable process corrections to be made more accurately on-line, in real time, thereby avoiding or minimizing the amount of repair work normally required.

What is claimed is:

1. An arc welding viewing system comprising:
   an external light source operable to generate a given intensity of light substantially within a preselected band within the visual spectrum, which is operable to be directed to illuminate the portion of the workpiece being welded; and
   means for viewing the portion of the workpiece being welded, including means for filtering the light reflected from the portion of the workpiece being welded to pass only the preselected band through the viewing means, wherein the preselected band is substantially narrower than the light spectrum generated by the welding arc.

2. The arc welding viewing system of claim 1 wherein the external source generates a monochromatic beam of light.

3. The arc welding viewing system of claim 2 wherein the preselected band has a 100° A bandwidth centered substantially around 5370° A.

4. The arc welding system of claim 3 wherein the external light source is a thallium iodide lamp.

5. A method of viewing the weld generated by an arc welding system comprising the steps of:
   illuminating the portion of the workpiece being welded with a given intensity of light substantially within a preselected band within the visual spectrum, which is generated from an external source; and
   filtering the light reflected from the portion of the workpiece being welded to the area from which the weld is to be viewed to pass only the preselected band, wherein the preselected band is substantially narrower than the light spectrum generated by the welding arc.

6. The method of claim 5 wherein the external source generates a monochromatic beam of light.

* * * * *